US012535303B2

(12) United States Patent
Mata et al.

(10) Patent No.: US 12,535,303 B2
(45) Date of Patent: Jan. 27, 2026

(54) DETECTING FLUID INGRESS IN A CONDUCTED ELECTRICAL WEAPON

(71) Applicant: Axon Enterprise, Inc., Scottsdale, AZ (US)

(72) Inventors: Gerzain Mata, Scottsdale, AZ (US); Peter J. Bills, Scottsdale, AZ (US); Lynn R. Kern, Phoenix, AZ (US); Alexander S. Caron, Glendale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 152 days.

(21) Appl. No.: 18/439,123

(22) Filed: Feb. 12, 2024

(65) Prior Publication Data

US 2024/0271914 A1  Aug. 15, 2024

Related U.S. Application Data

(60) Provisional application No. 63/445,153, filed on Feb. 13, 2023.

(51) Int. Cl.
F41H 13/00 (2006.01)
G01R 31/28 (2006.01)

(52) U.S. Cl.
CPC ..... *F41H 13/0012* (2013.01); *G01R 31/2849* (2013.01)

(58) Field of Classification Search
CPC ... F41A 17/06; F41H 13/0012; F41H 13/0025
USPC ......... 42/1.08, 70.11, 84, 70.01, 70.06, 1.01, 42/70.07; 361/230; 89/1.11, 27.12, 89/28.05; 102/502
See application file for complete search history.

(56) References Cited

U.S. PATENT DOCUMENTS

| | | | |
|---|---|---|---|
| 2011/0040515 A1 | 2/2011 | Miller et al. | |
| 2012/0078554 A1* | 3/2012 | Gagnon | F41H 13/0025 702/64 |
| 2017/0337504 A1* | 11/2017 | Dimino, Jr. | G06Q 90/00 |
| 2019/0128649 A1* | 5/2019 | Stethem | F41H 13/0018 |
| 2022/0373284 A1* | 11/2022 | Thiesen | F41A 19/59 |

FOREIGN PATENT DOCUMENTS

TW    202138740 A    10/2021

OTHER PUBLICATIONS

Korean Intellectual Property Office, International Search Report for International Application No. PCT/US24/15349 mailed Jun. 13, 2024.

* cited by examiner

Primary Examiner — Elim Ortiz
(74) Attorney, Agent, or Firm — Justin Powley

(57) ABSTRACT

A conducted electrical weapon ("CEW") may be subject to one or more environmental factors during operation. The environmental factors may impact normal functionality of the CEW. The CEW may detect an electrical property associated with a component of the CEW. The CEW may retrieve a lockout parameter associated with the component. The CEW may compare the electrical property to the lockout parameter. The CEW may determine a lockout condition based on the comparing. The CEW may perform the lockout condition on the CEW.

20 Claims, 7 Drawing Sheets

DETECTING FLUID INGRESS IN A CONDUCTED ELECTRICAL WEAPON

FIELD OF THE INVENTION

Embodiments of the present invention relate to detecting ingress of a fluid in a conducted electrical weapon ("CEW").

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
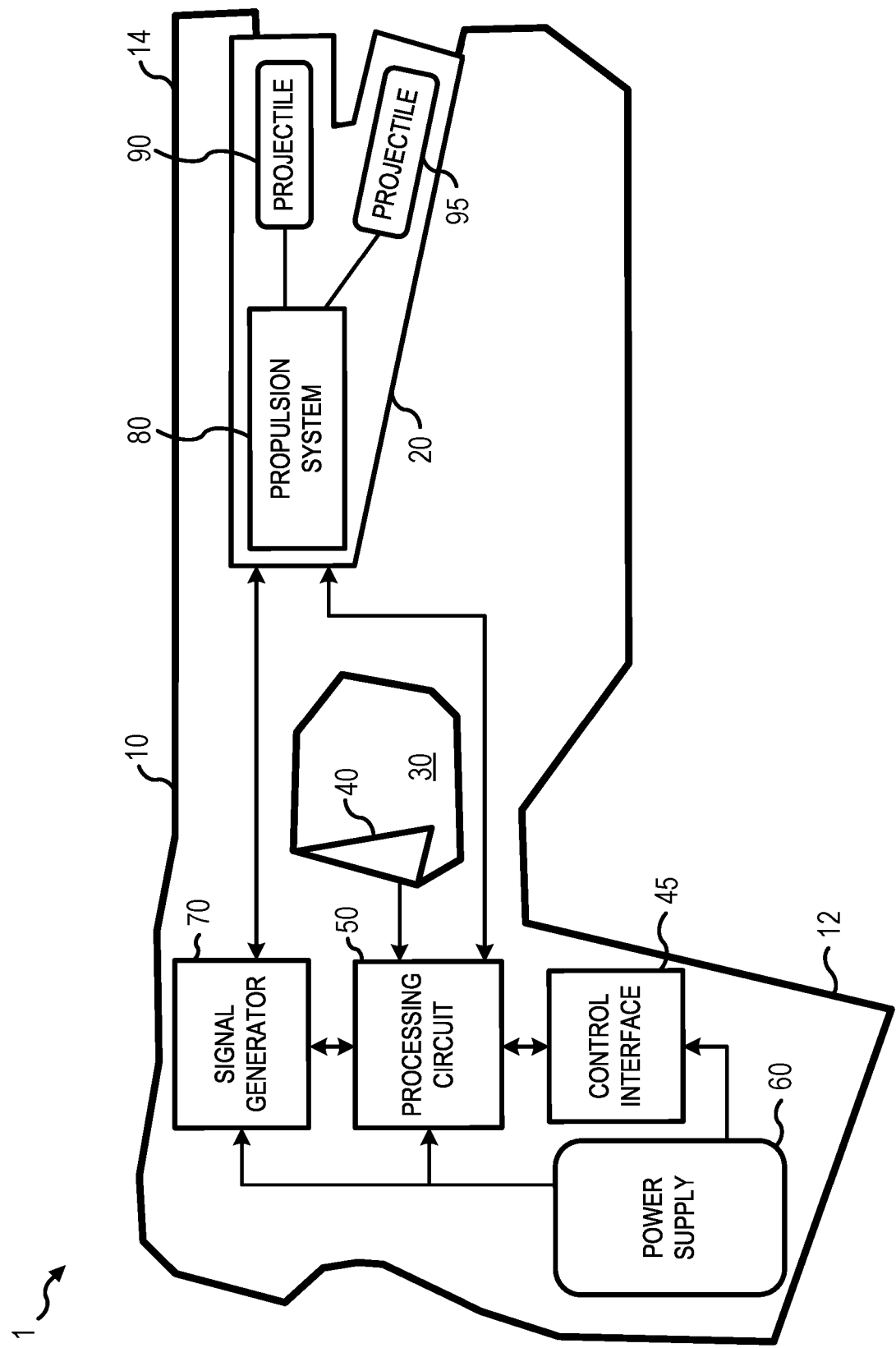
FIG. 1 illustrates a schematic diagram of a conducted electrical weapon, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a conducted electrical weapon (e.g., "CEW") may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, an electronic control device, and/or any other similar device or apparatus configured to provide a stimulus signal through one or more deployed projectiles (e.g., electrodes). Moreover, principles of the present disclosure may be applied to other less-lethal and non-lethal weapons and devices, including, for example, electronic devices configured to deploy projectiles towards a target, electronic devices configured for training purposes (e.g., to imitate less-lethal and/or non-lethal weapons), electronic devices configured for virtual reality (e.g., to imitate real-world use of less-lethal and/or non-lethal weapons), and/or the like.

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion by the target.

A stimulus signal may be delivered through the target via terminals coupled to the CEW. Delivery via terminals may be referred to as a local delivery (e.g., a local stun). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, their respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and first electrode, the target's tissue, and the second tether and second electrode).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

In various embodiments, a CEW may include at least two terminals at the face of the CEW. A CEW may include two terminals for each bay that accepts a deployment unit (e.g., cartridge). The terminals are spaced apart from each other. In response to the electrodes of the deployment unit in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the 6 or more inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per pulse being about 63 microcoulombs. Empirical testing has shown that a pulse rate of 22 pps and 63 microcoulombs per pulse via a pair of electrodes will induce NMI when the electrode spacing is about 12 inches (30.48 centimeters).

In various embodiments, a CEW may include a handle and one or more deployment units. The handle may include one or more bays for receiving the deployment units. Each deployment unit may be removably positioned in (e.g., inserted into, coupled to, etc.) a bay. Each deployment unit may releasably electrically, electronically, and/or mechanically couple to a bay. In various embodiments, a CEW may include a bay configured to receive a magazine comprising one or more electrodes. A deployment (e.g., launch) of the CEW may launch one or more electrodes toward a target to remotely deliver the stimulus signal through the target.

In various embodiments, a deployment unit may include two or more electrodes that are launched at the same time. In various embodiments, a deployment unit may include two or more electrodes that may be launched at separate times. Launching the electrodes may be referred to as activating (e.g., firing) a deployment unit. After use (e.g., activation, firing), a deployment unit may be removed from the bay and replaced with an unused (e.g., not fired, not activated) deployment unit to permit launch of additional electrodes.

In various embodiments, and with reference to FIG. 1, a CEW 1 is disclosed. CEW 1 may be similar to, or have similar aspects and/or components with, the CEWs previously discussed herein. It should be understood by one skilled in the art that FIG. 1 is a schematic representation of CEW 1, and one or more of the components of CEW 1 may be located in any suitable position within, or external to, housing 10. CEW 1 may comprise a housing 10 and one or more deployment units 20.

Housing 10 may be configured to house various components of CEW 1 configured to enable deployment of the deployment units 20, provide an electrical current to the deployment units 20, and otherwise aid in the operation of CEW 1, as discussed further herein. Although depicted as a firearm in FIG. 1, housing 10 may comprise any suitable shape and/or size. Housing 10 may comprise a handle end 12 opposite a deployment end 14. Deployment end 14 may be configured, and sized and shaped, to receive one or more deployment units 20. Handle end 12 may be sized and shaped to be held in a hand of a user. For example, handle end 12 may be shaped as a handle to enable hand-operation of the CEW by the user. In various embodiments, handle end 12 may also comprise contours shaped to fit the hand of a user, for example, an ergonomic grip. Handle end 12 may include a surface coating, such as, for example, a non-slip surface, a grip pad, a rubber texture, and/or the like. As a further example, handle end 12 may be wrapped in leather, a colored print, and/or any other suitable material, as desired.

In various embodiments, housing 10 may comprise various mechanical, electronic, and electrical components configured to aid in performing the functions of CEW 1. For example, housing 10 may comprise one or more triggers 40, control interfaces 45, processing circuits 50, power supplies 60, and/or signal generators 70. Housing 10 may include a guard 30. Guard 30 may define an opening formed in housing 10. Guard 30 may be located on a center region of housing 10 (e.g., as depicted in FIG. 1), and/or in any other suitable location on housing 10. Trigger 40 may be disposed within guard 30. Guard 30 may be configured to protect trigger 40 from unintentional physical contact (e.g., an unintentional activation of trigger 40). Guard 30 may surround trigger 40 within housing 10.

In various embodiments, trigger 40 be coupled to an outer surface of housing 10, and may be configured to move, slide, rotate, otherwise become physically depressed upon application of the physical contact. For example, trigger 40 may be actuated by physical contact applied to trigger 40 from within guard 30. Trigger 40 may comprise a mechanical or electromechanical switch, button, trigger, or the like. For example, trigger 40 may comprise a switch, a pushbutton, and/or any other suitable type of trigger. Trigger 40 may be mechanically and/or electronically coupled to processing circuit 50. In response to trigger 40 being activated (e.g., depressed, pushed, etc. by the user), processing circuit 50 may enable deployment of one or more deployment units 20 from CEW 1, as discussed further herein.

In various embodiments, power supply 60 may be configured to provide power to various components of CEW 1. For example, power supply 60 may provide energy for operating the electronic and/or electrical components (e.g., parts, subsystems, circuits) of CEW 1 and/or one or more deployment units 20. Power supply 60 may provide electrical power. Providing electrical power may include providing a current at a voltage. Power supply 60 may be electrically coupled to processing circuit 50 and/or signal generator 70. In various embodiments, in response to control interface 45 comprising electronic properties and/or components, power supply 60 may be electrically coupled to control interface 45. In various embodiments, in response to trigger 40 comprising electronic properties or components, power supply 60 may be electrically coupled to trigger 40. Power supply 60 may provide an electrical current at a voltage.

Electrical power from power supply 60 may be provided as a direct current ("DC"). Electrical power from power supply 60 may be provided as an alternating current ("AC"). Power supply 60 may include a battery. The energy of power supply 60 may be renewable or exhaustible, and/or replaceable. For example, power supply 60 may comprise one or more rechargeable or disposable batteries. In various embodiments, the energy from power supply 60 may be converted from one form (e.g., electrical, magnetic, thermal) to another form to perform the functions of a system.

Power supply 60 may provide energy for performing the functions of CEW 1. For example, power supply 60 may provide the electrical current to signal generator 70 that is provided through a target to impede locomotion of the target (e.g., via deployment unit 20). Power supply 60 may provide the energy for a stimulus signal. Power supply 60 may provide the energy for other signals, including an ignition signal and/or an integration signal, as discussed further herein.

In various embodiments, processing circuit 50 may comprise any circuitry, electrical components, electronic components, software, and/or the like configured to perform various operations and functions discussed herein. For example, processing circuit 50 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 50 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 50 may include data buses, output ports, input ports, timers, memory, arithmetic units, and/or the like.

In various embodiments, processing circuit 50 may include signal conditioning circuitry. Signal conditioning circuitry may include level shifters to change (e.g., increase, decrease) the magnitude of a voltage (e.g., of a signal) before receipt by processing circuit 50 or to shift the magnitude of a voltage provided by processing circuit 50.

In various embodiments, processing circuit 50 may be configured to control and/or coordinate operation of some or all aspects of CEW 1. For example, processing circuit 50 may include (or be in communication with) memory configured to store data, programs, and/or instructions. The memory may comprise a tangible, non-transitory computer-readable memory. Instructions stored on the tangible non-transitory memory may allow processing circuit 50 to perform various operations, functions, and/or steps, as described herein.

The term "non-transitory" is to be understood to remove only propagating transitory signals per se from the claim scope and does not relinquish rights to all standard computer-readable media that are not only propagating transitory signals per se. Stated another way, the meaning of the terms "non-transitory computer-readable memory" and "non-transitory computer-readable storage medium" should be construed to exclude only those types of transitory computer-readable media which were found in In re Nuijten to fall outside the scope of patentable subject matter under 35 U.S.C. § 101.

In various embodiments, the memory may comprise any hardware, software, and/or database component capable of storing and maintaining data. For example, the memory may comprise a database, data structure, memory component, or the like. The memory may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Processing circuit 50 may be configured to provide and/or receive electrical signals whether digital and/or analog in form. Processing circuit 50 may provide and/or receive digital information via a data bus using any protocol. Processing circuit 50 may receive information, manipulate the received information, and provide the manipulated information. Processing circuit 50 may store information and retrieve stored information. Information received, stored, and/or manipulated by processing circuit 50 may be used to perform a function, control a function, and/or to perform an operation or execute a stored program.

Processing circuit 50 may control the operation and/or function of other circuits and/or components of CEW 1. Processing circuit 50 may receive status information regarding the operation of other components, perform calculations with respect to the status information, and provide commands (e.g., instructions) to one or more other components. Processing circuit 50 may command another component to start operation, continue operation, alter operation, suspend operation, cease operation, or the like. Commands and/or status may be communicated between processing circuit 50 and other circuits and/or components via any type of bus (e.g., SPI bus) including any type of data/address bus.

Processing circuit 50 may be electrically and/or electronically coupled to deployment unit 20. Processing circuit 50 may be configured to determine one or more deployment unit characteristics associated with deployment unit 20. A deployment unit characteristic may include data indicating various characteristics of the deployment unit. A deployment unit characteristic may include a deployment unit type, a projectile type, a projectile position, a deployment instruction, and/or any other suitable or desired information relating to a deployment unit, a projectile, the CEW, or deployment of projectiles from the deployment unit.

In various embodiments, processing circuit 50 may be mechanically and/or electronically coupled to trigger 40. Processing circuit 50 may be configured to detect an activation, actuation, depression, input, etc. (collectively, an "activation event") of trigger 40. In response to detecting the activation event, processing circuit 50 may be configured to perform various operations and/or functions, as discussed further herein. Processing circuit 50 may also include a sensor (e.g., a trigger sensor) attached to trigger 40 and configured to detect an activation event of trigger 40. The sensor may comprise any suitable mechanical and/or electronic sensor capable of detecting an activation event in trigger 40 and reporting the activation event to processing circuit 50.

In various embodiments, processing circuit 50 may be mechanically and/or electronically coupled to control interface 45. Processing circuit 50 may be configured to detect an activation, actuation, depression, input, etc. (collectively, a "control event") of control interface 45. In response to detecting the control event, processing circuit 50 may be configured to perform various operations and/or functions, as discussed further herein. Processing circuit 50 may also include a sensor (e.g., a control sensor) attached to control interface 45 and configured to detect a control event of control interface 45. The sensor may comprise any suitable mechanical and/or electronic sensor capable of detecting a control event in control interface 45 and reporting the control event to processing circuit 50.

In various embodiments, processing circuit 50 may be electrically and/or electronically coupled to power supply 60. Processing circuit 50 may receive power from power supply 60. The power received from power supply 60 may be used by processing circuit 50 to receive signals, process signals, and transmit signals to various other components in CEW 1. Processing circuit 50 may use power from power supply 60 to detect an activation event of trigger 40, a control event of control interface 45, or the like, and generate one or more control signals in response to the detected events. The control signal may be based on the control event and the activation event. The control signal may be an electrical signal.

In various embodiments, processing circuit 50 may be electrically and/or electronically coupled to signal generator 70. Processing circuit 50 may be configured to transmit or provide control signals to signal generator 70 in response to detecting an activation event of trigger 40. Multiple control signals may be provided from processing circuit 50 to signal generator 70 in series. In response to receiving the control signal, signal generator 70 may be configured to perform various functions and/or operations, as discussed further herein.

In various embodiments, signal generator 70 may be configured to receive one or more control signals from processing circuit 50. Signal generator 70 may provide an ignition signal to deployment unit 20 based on the control signals. Signal generator 70 may be electrically and/or electronically coupled to processing circuit 50 and/or deployment unit 20. Signal generator 70 may be electrically coupled to power supply 60. Signal generator 70 may use power received from power supply 60 to generate an ignition signal. For example, signal generator 70 may receive an electrical signal from power supply 60 that has first current and voltage values. Signal generator 70 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 70 may temporarily store power from power supply 60 and rely on the stored power entirely or in part to provide the ignition signal. Signal generator 70 may also rely on received power from power supply 60 entirely or in part to provide the ignition signal, without needing to temporarily store power.

In various embodiments, signal generator 70 may include circuits for receiving electrical energy and for providing the stimulus signal. Electrical/electronic circuits (e.g., components) of signal generator 70 may include capacitors, resistors, inductors, spark gaps, transformers, silicon controlled rectifiers ("SCRs"), analog-to-digital converters, and/or the like.

Signal generator 70 may be controlled entirely or in part by processing circuit 50. In various embodiments, signal generator 70 and processing circuit 50 may be separate components (e.g., physically distinct and/or logically discrete). Signal generator 70 and processing circuit 50 may be a single component. For example, a control circuit within housing 10 may at least include signal generator 70 and processing circuit 50. The control circuit may also include other components and/or arrangements, including those that further integrate corresponding function of these elements into a single component or circuit, as well as those that further separate certain functions into separate components or circuits.

Signal generator 70 may be controlled by the control signals to generate an ignition signal having a predetermined current value or values. For example, signal generator 70 may include a current source. The control signal may be received by signal generator 70 to activate the current source at a current value of the current source. An additional control signal may be received to decrease a current of the current source. For example, signal generator 70 may include a pulse width modification circuit coupled between a current source and an output of the control circuit. A second control signal may be received by signal generator 70 to activate the pulse width modification circuit, thereby decreasing a nonzero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 70 may alternatively or additionally be employed, including those that apply a voltage over one or more different resistances to generate signals with different currents. In various embodiments, signal generator 70 may include a high-voltage (HV) module configured to deliver an electrical current having a high voltage. In various embodiments, signal generator 70 may include a low-voltage module configured to deliver an electrical current having a lower voltage, such as, for example, 2,000 volts.

Responsive to receipt of a signal indicating activation of trigger 40 (e.g., an activation event), a control circuit provides an ignition signal to deployment unit 20. For example, signal generator 70 may provide an electrical signal as an ignition signal to deployment unit 20 in response to receiving a control signal from processing circuit 50. In various embodiments, the ignition signal may be separate and distinct from a stimulus signal. For example, a stimulus signal in CEW 1 may be provided to a different circuit within deployment unit 20, relative to a circuit to which an ignition signal is provided. Signal generator 70 may be configured to generate a stimulus signal. In various embodiments, a second, separate signal generator, component, or circuit (not shown) within housing 10 may be configured to generate the stimulus signal. Signal generator 70 may also provide a ground signal path for deployment unit 20, thereby completing a circuit for an electrical signal provided to deployment unit 20 by signal generator 70. The ground signal path may also be provided to deployment unit 20 by other elements in housing 10, including power supply 60.

In various embodiments, power supply 60 may comprise an electrical circuit (e.g., a power supply electrical circuit, a power supply circuit, etc.) defining an electrical coupling between processing circuit 50 and power supply 60. For example, the electrical circuit may comprise an electrical path (e.g., a conductive path), one or more switches controlling the electrical circuit, and/or any other suitable or desired electrical circuit components. The electrical circuit may be configured to provide energy (e.g., electricity) from power supply 60 to processing circuit 50. In some embodiments, the electrical circuit may also be configured to provide energy from power supply 60 to one or more other components of CEW 1, such as control interface 45 and/or signal generator 70. Processing circuit 50 may be in electrical communication with one or more components of the electrical circuit. Processing circuit 50 may be configured to detect an electrical property of the electrical circuit. Processing circuit 50 may be configured to sample a voltage (e.g., a power supply voltage, a power supply circuit voltage, a power supply switch voltage, etc.) of the electrical circuit.

In various embodiments, trigger 40 may comprise an electrical circuit (e.g., a trigger electrical circuit, a trigger circuit, etc.) defining an electrical coupling between processing circuit 50 and trigger 40. For example, the electrical circuit may comprise an electrical path (e.g., a conductive path), one or more switches controlling the electrical circuit, and/or any other suitable or desired electrical circuit components. The electrical circuit may be configured to allow trigger 40 to provide trigger signals to processing circuit 50. The electrical circuit may be configured to allow processing circuit 50 to detect trigger signals from trigger 40. Processing circuit 50 may be in electrical communication with one or more components of the electrical circuit. Processing circuit 50 may be configured to detect an electrical property of the electrical circuit. Processing circuit 50 may be configured to sample a voltage (e.g., a trigger voltage, a trigger circuit voltage, a trigger switch voltage, etc.) of the electrical circuit.

In various embodiments, signal generator 70 may comprise one or more electrical circuits (e.g., signal generator electrical circuits, signal generator circuits, etc.) defining electrical couplings between signal generator 70 and one or more components of CEW 1.

For example, signal generator 70 may comprise a first electrical circuit (e.g., a first signal generator circuit, a signal generator input circuit, a charging circuit, etc.) defining an electrical coupling between power supply 60 and signal generator 70. The first electrical circuit may comprise an electrical path (e.g., a conductive path), one or more switches controlling the first electrical circuit, and/or any other suitable or desired electrical circuit components. The first electrical circuit may be configured to provide energy (e.g., electricity) from power supply 60 to signal generator 70. In some embodiments, the first electrical circuit may comprise one or more capacitors configured to store (e.g., accumulate) the energy received from power supply 50. In some embodiments, the first electrical circuit may comprise one or more switches and/or other suitable or desired electrical circuit components configured to control the provision of energy from power supply 60 to the one or more capacitors. In some embodiments, the first electrical circuit may comprise a high-voltage module (HV module) (e.g., a high-voltage transformer, an HV transformer, etc.) configured to receive energy from power supply 60. The HV module may receive pulses of energy from power supply 60. The pulses of energy may charge the HV module. Processing circuit 50 may be in electrical communication with one or more components of the first electrical circuit. Processing circuit 50 may be configured to detect an electrical property of the first electrical circuit. Processing circuit 50 may be configured to sample an input (e.g., an electrical input) of the first electrical circuit. In some embodiments, processing circuit 50 may be configured to determine (e.g., count) whether pulses of energy from power supply 60 successfully charged the HV module. For example, during a startup of CEW 1, during a load test of a CEW, and/or at any other suitable time, the HV module may receive a number of pulses from power supply 60 to charge the HV module and/or to ensure the HV module is capable of delivering a current. Processing circuit 50 may determine the number of pulses of energy that successfully charge the HV module and/or the number of pulses of energy that did not successfully charge the HV module.

As a further example, signal generator 70 may comprise a second electrical circuit (e.g., a second signal generator circuit, a signal generator output circuit, a discharging circuit, etc.) defining an electrical coupling between signal generator 70 and one or more electrical contacts proximate a bay of housing 10. The second electrical circuit may be different from the first electrical circuit. The second electrical circuit and the first electrical circuit may share one or more electrical components. The second electrical circuit may comprise an electrical path (e.g., a conductive path), one or more switches controlling the electrical circuit, and/or any other suitable or desired electrical circuit components. The second electrical circuit may be configured to provide energy (e.g., electricity) from signal generator 70 to the one or more electrical contacts proximate the bay of housing 10. For example, the second electrical circuit may be configured to provide one or more stimulus signals from signal generator 70 to deployment unit 20 via electrical contacts coupling housing 10 to deployment unit 20. As a further example, the second electrical circuit may be configured to provide one or more electrical signals from signal generator 70 to one or more exposed terminals on deployment end 14. The exposed terminals may be configured to provide a local delivery (e.g., a local stun) to a target. In some embodiments, the second electrical circuit may comprise one or more capacitors configured to store (e.g., accumulate) the energy received from power supply 50 and discharge the stored energy to provide an electrical signal and/or stimulus signal. In some embodiments, the second electrical circuit may comprise one or more switches and/or other suitable or desired electrical circuit components configured to control the provision of energy from the one or more capacitors. Processing circuit 50 may be in electrical communication with one or more components of the second electrical circuit. Processing circuit 50 may be configured to detect an electrical property of the second electrical circuit. Processing circuit 50 may be configured to sample an output (e.g., an electrical output) of the second electrical circuit. In some embodiments, processing circuit 50 may be configured to determine whether the one or more capacitors of the second electrical circuit properly discharged to provide an electrical signal and/or stimulus signal. Processing circuit 50 may sample an output of the one or more capacitors to determine whether the one or more capacitors properly discharged.

In various embodiments, a bay of housing 10 may be configured to receive one or more deployment units. The bay may comprise an opening in deployment end 14 sized and shaped to receive one or more deployment units. The bay may include one or more mechanical features configured to removably couple one or more deployment units within the bay. The bay may be configured to receive a single deployment unit, two deployment units, or any other number of deployment units.

In various embodiments, a deployment unit 20 may comprise a propulsion system 80 and a plurality of projectiles, such as, for example, a first projectile 90 and a second projectile 95. Deployment unit 20 may comprise any suitable or desired number of projectiles, such as, for example two projectiles, three projectiles, ten projectiles, and/or any other desired number of projectiles.

In various embodiments, propulsion system 80 may be coupled to, or in communication with, each projectile in deployment unit 20. In various embodiments, deployment unit 20 may comprise a plurality of propulsion systems 80, with each propulsion system 80 coupled to, or in communication with, one or more projectiles. Propulsion system 80 may comprise any device, propellant (e.g., air, gas, etc.), primer, or the like capable of providing a propulsion force in deployment unit 20. The propulsion force may include an increase in pressure caused by rapidly expanding gas within an area or chamber. The propulsion force may be applied to projectiles 90, 95 in deployment unit 20 to cause the deployment of projectiles 90, 95. Propulsion system 80 may provide the propulsion force in response to deployment unit 20 receiving the ignition signal.

In various embodiments, the propulsion force may be directly applied to one or more projectiles 90, 95. For example, the propulsion force may be provided directly to first projectile 90 or second projectile 95. Propulsion system 80 may be in fluid communication with projectiles 90, 95 to provide the propulsion force. For example, the propulsion force from propulsion system 80 may travel within a housing or channel of deployment unit 20 to one or more projectiles 90, 95. The propulsion force may travel via a manifold in deployment unit 20.

In various embodiments, the propulsion force may be provided indirectly to first projectile 90 and/or second projectile 95. For example, the propulsion force may be provided to a secondary source of propellant within propulsion system 80. The propulsion force may launch the secondary source of propellant within propulsion system 80, causing the secondary source of propellant to release propellent. A force associated with the released propellant may in turn provide a force to one or more projectiles 90, 95. A force generated by a secondary source of propellent may cause projectiles 90, 95 to be deployed from the deployment unit 20 and CEW 1.

In various embodiments, each projectile 90, 95 may comprise any suitable type of projectile. For example, one or more projectiles may be or include an electrode (e.g., an electrode dart), an entangling projectile (e.g., a tether-based entangling projectile, a net, etc.), a payload projectile (e.g., comprising a liquid or gas substance), or the like. A projectile may include a spear portion, designed to pierce or attach proximate a tissue of a target in order to provide a conductive electrical path between the electrode and the tissue, as previously discussed herein. For example, projectiles 90, 95 may each include a respective electrode. Projectiles 90, 95 may be deployed from deployment unit 20 at the same time or substantially the same time. Projectiles 90, 95 may be launched by a same propulsion force from a common propulsion system 80. Projectiles 90, 95 may also be launched by one or more propulsion forces received from one or more propulsion systems 80. Deployment unit 20 may include an internal manifold configured to transfer a propulsion force from propulsion system 80 to one or more projectiles 90, 95.

In various embodiments, signal generator 70 may be in electrical series with deployment unit and each projectile 90, 95. For example, signal generator 70 may be in electrical series with one or more electrical contacts (e.g., a handle contact, a handle electrical contact, etc.) disposed with the bay of handle 10. The electrical contact may be at least partially exposed within the bay. In response to deployment unit 20 being inserted within the bay, the electrical contact may engage (e.g., electrically couple to) one or more electrical contacts or features of deployment unit 20 (e.g., a deployment unit contact, a deployment unit electrical contact, etc.). Propulsion system 80 may be in electrical series with the one or more electrical contacts or features of deployment unit 20. Each projectile 90, 95 may be in electrical series with the one or more electrical contacts or features of deployment unit 20.

Signal generator 70 may be configured to provide one or more electrical signals to deployment unit 20 via the one or more electrical contacts. For example, signal generator 70 and/or processing circuit 50 may control provision of electrical signals to deployment unit 20, via the electrical contact. Signal generator 70 and/or processing circuit 50 may control provision of electrical signals by enabling and/or disabling an electrical connection. The electrical connection may define the electrical coupling between signal generator 70 and the electrical contact. Signal generator 70 and/or processing circuit 50 may enable and/or disable the electrical connection using any suitable technique or process, such as, for example, by selectively providing electrical signals, opening and/or closing circuits or switches, and/or the like. In some embodiments, providing an electrical signal may include providing a low voltage detection signal, an ignition signal, a stimulus signal, and/or the like.

In various embodiments, control interface 45 of CEW 1 may comprise, or be similar to, any control interface disclosed herein. In various embodiments, control interface 45 may be configured to control selection of firing modes in CEW 1. Controlling selection of firing modes in CEW 1 may include disabling firing of CEW 1 (e.g., a safety mode, etc.), enabling firing of CEW 1 (e.g., an active mode, a firing mode, an escalation mode, etc.), controlling deployment of a projectile, and/or similar operations, as discussed further herein. In various embodiments, control interface 45 may also be configured to perform (or cause performance of) one or more operations that do not include the selection of firing modes. For example, control interface 45 may be configured to enable the selection of operating modes of CEW 1, selection of options within an operating mode of CEW 1, or similar selection or scrolling operations, as discussed further herein.

Control interface 45 may be located in any suitable location on or in housing 10. For example, control interface 45 may be coupled to an outer surface of housing 10. Control interface 45 may be coupled to an outer surface of housing 10 proximate trigger 40 and/or a trigger guard of housing 10. Control interface 45 may be electrically, mechanically, and/or electronically coupled to processing circuit 50. In various embodiments, in response to control interface 45 comprising electronic properties or components, control interface 45 may be electrically coupled to power supply 60. Control interface 45 may receive power (e.g., electrical current) from power supply 60 to power the electronic properties or components.

Control interface 45 may be electronically or mechanically coupled to trigger 40. For example, and as discussed further herein, control interface 45 may function as a safety mechanism. In response to control interface 45 being set to a "safety mode," CEW 1 may be unable to launch electrodes from deployment unit 20. For example, control interface 45 may provide a signal (e.g., a control signal) to processing circuit 50 instructing processing circuit 50 to disable deployment of electrodes from deployment unit 20. As a further example, control interface 45 may electronically or mechanically prohibit trigger 40 from activating (e.g., prevent or disable a user from depressing trigger 40; prevent trigger 40 from launching an electrode; etc.).

Control interface 45 may comprise any suitable electronic or mechanical component capable of enabling selection of firing modes. For example, control interface 45 may comprise a fire mode selector switch, a safety switch, a safety catch, a rotating switch, a selection switch, a selective firing mechanism, and/or any other suitable mechanical control. As a further example, control interface 45 may comprise a slide, such as a handgun slide, a reciprocating slide, or the like. As a further example, control interface 45 may comprise a touch screen, user interface or display, or similar electronic visual component.

The safety mode may be configured to prohibit deployment of a projectile from deployment unit 20. For example, in response to a user selecting the safety mode, control interface 45 may transmit a safety mode instruction to processing circuit 50. In response to receiving the safety mode instruction, processing circuit 50 may prohibit deployment of a projectile from deployment unit 20. Processing circuit 50 may prohibit deployment until a further instruction is received from control interface 45 (e.g., a firing mode instruction). As previously discussed, control interface 45 may also, or alternatively, interact with trigger 40 to prevent physical activation of trigger 40. In various embodiments, the safety mode may also be configured to prohibit deployment of a stimulus signal from signal generator 45, such as, for example, a local delivery.

The firing mode may be configured to enable deployment of one or more projectiles from deployment unit 20 in CEW 1. For example, and in accordance with various embodiments, in response to a user selecting the firing mode, control interface 45 may transmit a firing mode instruction to processing circuit 50. In response to receiving the firing mode instruction, processing circuit 50 may enable deployment of a projectile from deployment unit 20. In that regard, in response to trigger 40 being activated, processing circuit 50 may cause the deployment of one or more projectiles. Processing circuit 50 may enable deployment until a further instruction is received from control interface 45 (e.g., a safety mode instruction). As a further example, and in accordance with various embodiments, in response to a user selecting the firing mode, control interface 45 may also mechanically (or electronically) interact with trigger 40 of CEW 1 to enable activation of trigger 40.

In various embodiments, CEW 1 may comprise other modes operable into by control interface 45. For example, CEW 1 may comprise modes including a training mode, a manufacturing mode, a functional test mode, a stealth mode, a virtual reality mode, and/or the like. In these modes, one or more features or components of CEW 1 may be enabled or disabled compared to the standard firing mode and/or safety mode. For example, in the training mode a provision of a stimulus signal may be disabled. As a further example, in the stealth mode audio and/or light components may be disabled. As a further example, in the virtual reality mode, signals for deploying cartridges and/or provisional of a stimulus signal may be disabled.

In various embodiments, CEW 1 may further comprise one or more user interfaces. A user interface may be configured to receive an input from a user of CEW 1 and/or transmit or provide an output to the user of CEW 1. A user interface may be located in any suitable location on or in housing 10. For example, a user interface may be coupled to an outer surface of housing 10, or extend at least partially through the outer surface of housing 10. A user interface may be electrically, mechanically, and/or electronically coupled to processing circuit 50. In various embodiments, in response to a user interface comprising electronic or electrical properties or components, the user interface may be electrically coupled to power supply 60. The user interface may receive power (e.g., electrical current) from power supply 60 to power the electronic properties or components.

In various embodiments, a user interface may comprise one or more components configured to receive an input from a user. For example, a user interface may comprise one or more of an audio capturing module (e.g., microphone) configured to receive an audio input, a visual display (e.g., touchscreen, LCD, LED, etc.) configured to receive a manual input, a mechanical interface (e.g., button, switch, etc.) configured to receive a manual input, and/or the like. In various embodiments, a user interface may comprise one or more components configured to transmit or produce an output. For example, a user interface may comprise one or more of an audio output module (e.g., audio speaker) configured to output audio, a light-emitting component (e.g., flashlight, laser guide, etc.) configured to output light, a haptic module configured to provide haptic feedback and/or output (e.g., a haptic motor, a haptic driver, a vibrating motor, an eccentric rotating mass (ERM) vibration motor, etc.), a visual display (e.g., touchscreen, LCD, LED, etc.) configured to output a visual, and/or the like.

In various embodiments, a housing of a CEW may be subject to various environmental conditions. For example, a housing of a CEW may be subject to environmental conditions such as temperature, moisture, and other gasses, liquids, and solids. A housing of a CEW may not be hermetically sealed. Further, one or more components of a CEW (e.g., electrical contacts, triggers, terminals, interfaces, etc.) may be exposed external the housing. In that regard, a housing of a CEW may be subject to ingress of fluids and other foreign particles (e.g., dust) and objects (collectively referred to herein as "fluid"). Ingress of fluids within a housing of a CEW may cause one or more electrical, electronic, and/or mechanical components of the CEW to malfunction. For example, ingress of a fluid may cause one or more electrical circuits or components to short and/or malfunction. Malfunctioning components may cause a CEW to interrupt and/or cease normal functioning of the CEW. Malfunctioning components may cause a CEW to self-arm without input from a user. Malfunctioning components may cause a CEW to fail to deploy projectiles during operation. Malfunctioning components may cause a CEW to prematurely deploy projectiles before an intended activation. Malfunctioning components may cause a CEW to delay deploying projectiles after an activation (e.g., darts deploy 3-5 seconds after an activation). Malfunctioning components may cause a CEW to fail to provide a stimulus signal through deployed projectiles. Malfunctioning components may cause a CEW to accidentally discharge electrical current.

In various embodiments, a CEW may be configured to detect (e.g., determine) ingress of a fluid (e.g., fluid, foreign particle, dust, object, etc.) within a housing of the CEW. The CEW may be configured to detect ingress of a fluid without the use of a humidity sensor, moisture sensor, or the like. The CEW may be configured to detect ingress of a fluid using any suitable technique or process. The CEW may be configured to detect ingress of a fluid by determining that a circuit and/or component of the CEW is malfunctioning. The CEW may be configured to detect ingress of a fluid by determining that a circuit and/or component of the CEW is exhibiting unconventional behavior (e.g., the fluid, residual from the fluid, and/or damage from the fluid is interrupting the normal functionality of the circuit and/or component).

In various embodiments, a CEW may be configured to detect ingress of a fluid by retrieving, determining, sampling, detecting, measuring, and/or the like feedback from one or more circuits and/or components of the CEW. The CEW may determine whether the feedback is within a normal operating range for the one or more circuits and/or components. For example, the CEW may compare the feedback against a threshold and/or operating range associated with the one or more circuits and/or components. Based on the comparing, the CEW may determine whether the one or more circuits and/or components of the CEW are operating normally or exhibiting unconventional behavior. In response to the CEW determining that one or more circuits and/or components of the CEW are exhibiting unconventional behavior, the CEW may alert a user and/or perform a safety action. For example, the CEW may output an alert on a user interface, output a light, output a sound, and/or the like to alert the user. The CEW may temporarily prevent deployment of the CEW, permanently prevent deployment of the CEW, lock the CEW until a maintenance event is performed on the CEW, and/or the like.

In some embodiments, the CEW may be configured to determine whether feedback from a first circuit and/or component of the CEW is within a normal operating range. In response to the CEW determining that the first circuit and/or component of the CEW is exhibiting unconventional behavior, the CEW may alert a user and/or perform a safety action. In response to the CEW determining that the first circuit and/or component of the CEW is exhibiting unconventional behavior, the CEW may also determine whether feedback from a next circuit and/or component of the CEW is within a normal operating range. In response to the CEW determining that the next circuit and/or component of the CEW is exhibiting unconventional behavior, the CEW may alert a user (e.g., a next alert) and/or perform a next safety action.

In that regard, the CEW may retrieve, determine, sample, detect, measure, and/or the like feedback from a plurality of circuits and/or components of the CEW. In some embodiments, an ordered list may define an order of circuits and/or components the CEW is configured to retrieve, determine, sample, detect, measure, and/or the like feedback from. In some embodiments, feedback from the first circuit may define the next circuit to retrieve, determine, sample, detect, measure, and/or the like feedback from. In some embodiments, the CEW may retrieve, determine, sample, detect, measure, and/or the like feedback from the next circuit in response to the CEW determining that the first circuit and/or component of the CEW is exhibiting unconventional behavior. In some embodiments, the CEW may retrieve, determine, sample, detect, measure, and/or the like feedback from the next circuit regardless of whether the CEW determines that the first circuit and/or component of the CEW is exhibiting unconventional behavior.

In various embodiments, CEW 1 may be configured to detect ingress of a fluid interrupting a normal functionality of CEW 1. One or more components of CEW 1 may be configured to interact to detect ingress of the fluid. For example, processing circuit 50 may be configured to perform one or more operations to detect ingress of a fluid. In some embodiments, CEW 1 may interact with an external device, such as a computer-based system, a server, a smartphone, and/or the like, to detect ingress of the fluid.

CEW 1 may be configured to detect ingress of a fluid at any suitable time. For example, CEW 1 may be configured to detect ingress of a fluid before, during, and/or after use or operation of CEW 1. CEW 1 may be configured to detect ingress of a fluid during a load test. A load test may be performed during startup of CEW 1 (e.g., activation of a user interface, activation of a control interface, etc.), in response to CEW 1 receiving a power supply, before or in response to a trigger activation, before or in response to delivering a stimulus signal, and/or at any other suitable or desired time.

In various embodiments, processing circuit 50 may be configured to detect ingress of a fluid by detecting (e.g., retrieving, determining, sampling, measuring, etc.) an electrical property of CEW 1. As previously discussed, processing circuit 50 may be in electrical communication (e.g., electrically coupled) to one or more circuits and/or components of CEW 1. For example, processing circuit 50 may be in electrical communication with trigger 40, control interface 45, power supply 60, and/or signal generator 70. Processing circuit 50 may be in electrical communication with a power supply circuit, a trigger circuit, one or more signal generator circuits, and/or any other electrical circuit of CEW 1. An electrical property may be associated with one or more circuits and/or components of CEW 1. An electrical property may comprise a voltage measurement, an impedance measurement, a measurement of an electrical signal input into a circuit or component, a measurement of an electrical signal output from a circuit or component, an electrical resistivity measurement, an electrical conductivity measurement, a dielectric strength measurement, and/or the like. Processing circuit 50 may detect the electrical property using any suitable process or technique.

In various embodiments, processing circuit 50 may be configured to retrieve a lockout parameter associated with the one or more circuits and/or components of the detected electrical property. For example, CEW 1 may store one or more lockout parameters in memory. The one or more lockout parameters may be associated with a circuit and/or component. For example, a first lockout parameter may be associated with a first circuit (e.g., trigger circuit), a second lockout parameter may be associated with a second circuit (e.g., power supply circuit), a third lockout parameter may be associated with a third circuit (e.g., signal generator input circuit), a fourth lockout parameter may be associated with a fourth circuit (e.g., signal generator output circuit), and/or the like. As a further example, a first lockout parameter may be associated with a first component (e.g., trigger 40), a second lockout parameter may be associated with a second component (e.g., power supply 60), a third lockout parameter may be associated with a third component (e.g., signal generator 70), and/or the like. In some embodiments, a lockout parameter may be associated with a plurality of circuits and/or components. For example, a first lockout parameter may be associated with a first circuit, a second circuit, and/or the like; a second lockout parameter may be associated a third circuit, a fourth circuit, and/or the like, etc. Processing circuit 50 may retrieve from the memory one or more lockout parameters associated with the one or more circuits and/or components of the detected electrical property.

A lockout parameter may define a normal operating measurement (e.g., an expected operating measurement, a typical operating measurement, etc.) of one or more circuits and/or components. For example, the lockout parameter may comprise a threshold defining a minimum measurement and/or a maximum measurement expected within a normal operating measurement of a circuit or component. As a further example, a lockout parameter may define a measurement range expected for a normal operating measurement of a circuit or component.

In various embodiments, processing circuit 50 may compare the detected electrical property to the lockout parameter. For example, processing circuit 50 may compare whether the electrical property is greater than a minimum measurement, less than a maximum measurement, within a measurement range, and/or the like as defined by the lockout parameter. In response to the comparing indicating that the detected electrical property is within a normal operating measurement, processing circuit 50 may determine that there was not fluid ingress within CEW 1 (e.g., no fluid ingress, no fluid ingress that caused damage, no fluid ingress that impacted functionality, etc.). In response to the comparing indicating that the detected electrical property is not within a normal operating measurement, processing circuit 50 may determine that there was fluid ingress within CEW 1 (e.g., fluid ingress, fluid ingress that caused damage, fluid ingress that impacted functionality, etc.).

In various embodiments, processing circuit 50 may be configured to perform a lockout condition. Performing the lockout condition may be based on comparing the detected electrical property to the lockout parameter. For example, in response to the comparing indicating that the detected electrical property is not within a normal operating measurement, processing circuit 50 may perform the lockout condition. In response to the comparing indicating that the detected electrical property is within a normal operating measurement, processing circuit 50 may not perform the lockout condition.

In various embodiments, performing the lockout condition may be based on comparing a plurality of detected electrical properties to one or more lockout parameters. For example, in response to the comparing indicating that a first detected electrical property and a second detected electrical property are not within normal operating measurements, processing circuit 50 may perform the lockout condition. As a further example, in response to the comparing indicating that a first detected electrical property is not within a first normal operating measurement and a second detected electrical property is not within a second normal operating measurements, processing circuit 50 may perform the lockout condition. As a further example, in response to the comparing indicating that a first detected electrical property is not within a first normal operating measurement and a second detected electrical property is not within a second normal operating measurements, processing circuit 50 may perform a first lockout condition and/or a second lockout condition.

In various embodiments, the lockout condition may comprise a lockout alert and/or a lockout action. The lockout alert may be configured to alert a user of CEW 1 that CEW 1 is not functioning properly. For example, the lockout alert may comprise a visual alert (e.g., light output, a change in light output, a flashing light, a user display output, etc.), an audio alert (e.g., an audible output, a warning sound, etc.), a haptic alert (e.g., a haptic output, a haptic feedback, etc.), and/or the like.

The lockout action may be configured to at least partially disable features and/or functionality of CEW 1. The lockout action may be written in memory of CEW 1. At least partially disabling features and/or functionality of CEW 1 may include disabling one or more features or components of CEW 1, temporarily preventing deployment of CEW 1, permanently preventing deployment of CEW 1, and/or the like. Disabling one or more features or components of CEW 1 may include disabling an output (e.g., visual output, audio output, haptic output, etc.), disabling a mode, disabling (e.g., ceasing to provide energy to) an electrical or electronic component, disabling a mechanical component, disabling provision of a stimulus signal, disabling deployment of deployment units, and/or the like. Temporarily preventing deployment of CEW 1 may include preventing deployment of CEW 1 until an unlock event occurs. An unlock event may include an operation of an interface (e.g., operation of a user interface, control interface, etc.), removing a power supply, providing a new power supply, a maintenance event, successful completion of a new load test, and/or the like. Permanently preventing deployment of CEW 1 may include preventing deployment of CEW regardless of whether an unlock event occurred. In that regard, CEW 1 may no longer be used for future deployments (e.g., permanently disabled).

In some embodiments, a lockout action may define a next electrical circuit and/or component of a CEW to test. For example, the lockout action may define a next electrical circuit and/or component of a CEW to detect an electrical property of, retrieve an associated lockout parameter for, and compare the electrical property to the lockout parameter to determine a next lockout condition.

As an example, and in accordance with various embodiments, processing circuit 50 may be configured to detect ingress of a fluid by detecting an electrical property of power supply 60 and/or a power supply circuit. Processing circuit 50 may detect ingress of the fluid by detecting impedance between power supply 60 and signal generator 70. Processing circuit 50 may be configured to detect abnormal voltage levels on the power supply circuit. Processing circuit 50 may be configured to sample a voltage of the power supply circuit. Processing circuit 50 may be configured to retrieve a voltage threshold (e.g., a power supply voltage threshold, a power supply circuit voltage threshold, etc.) from memory. The voltage threshold may be associated with power supply 60 and/or the power supply circuit. The voltage threshold may define a normal voltage level (or abnormal voltage level) for power supply 60 and/or the power supply circuit. The voltage threshold may define a minimum voltage, a maximum voltage, an acceptable voltage range, and/or the like. For example, the voltage threshold may define a minimum voltage of 2.5 volts. Processing circuit 50 may compare the sampled voltage to the voltage threshold. In response to the sampled voltage being outside the voltage threshold (e.g., less than the minimum voltage, greater than the maximum voltage, not within the acceptable voltage range, etc.), processing circuit 50 may determine a lockout condition. For example, processing circuit 50 may sample a voltage of the power supply circuit at 3.5 volts. The sampled voltage of 3.5 volts is greater than the minimum voltage of 2.5 volts, so processing circuit 50 may proceed without determining a lockout condition. As a further example, processing circuit 50 may sample a voltage of the power supply circuit at 1.7 volts. The sampled voltage of 1.7 volts is less than the minimum voltage of 2.5 volts, so processing circuit 50 may proceed with determining a lockout condition. The lockout condition may be associated with power supply 60 and/or the power supply circuit. The lockout condition may define a lockout alert and/or a lockout action, as previously discussed. In response to processing circuit 50 determining that the sampled voltage is outside the voltage threshold, processing circuit 50 may perform the lockout condition (e.g., output a lockout alert, execute a lockout action, etc.). For example, the lockout condition may comprise a lockout alert of flashing a red power LED.

As a further example, and in accordance with various embodiments, processing circuit 50 may be configured to detect ingress of a fluid by detecting an electrical property of trigger 40 and/or a trigger circuit. Processing circuit 50 may be configured to detect abnormal voltage levels on the trigger circuit. Processing circuit 50 may be configured to sample a voltage of the trigger circuit. Processing circuit 50 may be configured to retrieve a voltage threshold (e.g., a trigger voltage threshold, a trigger circuit voltage threshold, a trigger switch voltage threshold, etc.) from memory. The voltage threshold may be associated with trigger 40 and/or the trigger circuit. The voltage threshold may define a normal voltage level (or abnormal voltage level) for trigger 40 and/or the trigger circuit. The voltage threshold may define a minimum voltage, a maximum voltage, an acceptable voltage range, and/or the like. Processing circuit 50 may compare the sampled voltage to the voltage threshold. In response to the sampled voltage being outside the voltage threshold (e.g., less than the minimum voltage, greater than the maximum voltage, not within the acceptable voltage range, etc.), processing circuit 50 may determine a lockout condition. For example, a trigger switch of the trigger circuit may transition from HI to LOW (5 volts to 0 volts) at a fast rate. Processing circuit 50 may sample the trigger switch digitally. The voltage threshold may define normal voltage levels as voltage above 4.2 volts or below 0.5 volts. Accordingly, a sampled voltage between 4.2 volts and 0.5 volts would indicate an abnormal voltage level. Processing circuit 50 may sample the trigger switch at intervals. For example, processing circuit 50 may sample the trigger switch multiple times a second, such as 50 times a second. In some embodiments, processing circuit 50 may determine a lockout condition in response to the comparing indicating a single sampled voltage was an abnormal voltage level. In some embodiments, processing circuit 50 may determine a lockout condition in response to the comparing indicating a plurality of sampled voltages were abnormal. In response to the sampled voltage (a single sampled voltage and/or a plurality of sampled voltages) not indicating an abnormal voltage level, processing circuit 50 may proceed without determining a lockout condition. The lockout condition may be associated with trigger 40 and/or the trigger circuit. The lockout condition may define a lockout alert and/or a lockout action, as previously discussed. In response to processing circuit 50 determining that the sampled voltage is abnormal, processing circuit 50 may perform the lockout condition (e.g., output a lockout alert, execute a lockout action, etc.). For example, the lockout condition may comprise a lockout alert of flashing a red power LED and an aiming LASER. The lockout condition may also comprise a lockout action of permanently preventing deployment of CEW 1.

As a further example, and in accordance with various embodiments, processing circuit 50 may be configured to detect ingress of a fluid by detecting an electrical property (e.g., an input electrical property) of signal generator 70 and/or a signal generator circuit. Processing circuit 50 may detect impedance between power supply 60 and signal generator 70. Processing circuit 50 may detect whether an HV module of a signal generator input circuit is able to be charged. Processing circuit 50 may detect whether the HV module of a signal generator input circuit is able to be charged a plurality of times. Processing circuit 50 may be configured to retrieve an input threshold (e.g., an input circuit threshold, a signal generator input circuit threshold, an HV module count, etc.) from memory. The input threshold may be associated with signal generator 70 and/or the signal generator input circuit. The input threshold may define a minimum count the HV module should be successfully charged during a normal test, a range of count the HV module should be successfully charged during a normal test, and/or the like. Processing circuit 50 may compare the input result to the input threshold. In response to the input result being outside the input threshold (e.g., less than the minimum count, not within the range of count, etc.), processing circuit 50 may determine a lockout condition. For example, processing circuit 50 may sample input of signal generator 70, the HV module, and/or the signal generator input circuit. Sampling input may comprise determining and counting a number of times the HV module is successfully charged. During a load test, the HV module may be repeatedly charged with pulses of electricity. For example, the HV module may be charged 280 times (e.g., 280 charging events, 280 successful charging pulses, etc.). The input threshold may define a minimum number of successful charges during a normal load test, such as, for example, 150 successful charges. Accordingly, an input result indicating the HV module was successfully charged in 160 of 280 charging events may indicate that the HV module is functioning properly. An input result indicating the HV module was successfully charged in 110 of 280 charging events may indicate that the HV module is not functioning properly. Processing circuit 50 may determine a lockout condition in response to the comparing indicating the HV module is not functioning properly. The lockout condition may be associated with signal generator 70, the HV module, and/or the signal generator input circuit. The lockout condition may define a lockout alert and/or a lockout action, as previously discussed. In response to processing circuit 50 determining that HV module is not functioning properly, processing circuit 50 may perform the lockout condition (e.g., output a lockout alert, execute a lockout action, etc.). For example, the lockout condition may comprise a lockout alert of flashing a red power LED. The lockout condition may also comprise a lockout action of temporarily preventing deployment of CEW 1. The temporary prevention may be removed in response to an unlock event being performed on CEW 1, such as, for example, successful completion of a new load test.

As a further example, and in accordance with various embodiments, processing circuit 50 may be configured to detect ingress of a fluid by detecting an electrical property (e.g., an output electrical property) of signal generator 70 and/or a signal generator circuit. Processing circuit 50 may sample an output of signal generator 70 and/or a signal generator output circuit. Processing circuit 50 may detect a change in decay rate of a capacitor of the signal generator output circuit (e.g., a muscle capacitor). For example, during or responsive to a fluid ingress a significant change in decay rate may be observed in one or more capacitors of the signal generator output circuit. Processing circuit 50 may be configured to retrieve an output threshold (e.g., an output circuit threshold, a signal generator output circuit threshold, a normal decay rate, etc.) from memory. The output threshold may be associated with signal generator 70 and/or the signal generator output circuit. The output threshold may define a minimum decay rate, a maximum decay rate, a decay rate range, and/or the like associated with the capacitor. Processing circuit 50 may compare the output result to the output threshold. In response to the output result being outside the output threshold (e.g., less than the minimum decay rate, greater than the maximum decay rate, not within the decay rate range, etc.), processing circuit 50 may determine a lockout condition. For example, processing circuit 50 may sample output of signal generator 70, the capacitor, and/or the signal generator output circuit. Sampling output may comprise determining a decay rate of the capacitor. An output result may comprise a voltage measurement over a period of time. The output threshold may define a threshold and a time of measurement defining a normal decay rate. For example, the output threshold may comprise a minimum threshold of 80 millivolts and a time of measurement of 400 milliseconds. The time of measurement may be the same as the period of time. Accordingly, an output result indicating a voltage measurement of 90 millivolts and a time of measurement of 400 millisecond may indicate that the capacitor is functioning properly. An output result indicating a voltage measurement of 70 millivolts and a time of measurement of 400 millisecond may indicate that the capacitor is not functioning properly. Processing circuit 50 may determine a lockout condition in response to the comparing indicating the capacitor is not functioning properly. The lockout condition may be associated with signal generator 70, the capacitor, and/or the signal generator output circuit. The lockout condition may define a lockout alert and/or a lockout action, as previously discussed. In response to processing circuit 50 determining that the capacitor is not functioning properly, processing circuit 50 may perform the lockout condition (e.g., output a lockout alert, execute a lockout action, etc.). For example, the lockout condition may comprise a lockout alert of flashing a red power LED. The lockout condition may also comprise a lockout action of disabling a flashlight and/or an aiming LASER of CEW 1. The lockout action may be removed in response to an unlock event being performed on CEW 1, such as, for example, successful completion of a new load test, replacement of a new, fully charged power supply, and/or the like.

In various embodiments, processing circuit 50 may also be configured to at least partially prevent an unintended deployment of CEW 1 in response to a power supply being inserted into CEW 1 while CEW 1 is armed (e.g., control interface 45 set to armed, fluid ingress providing a false armed signal control interface 45, etc.) and trigger 40 being activated (e.g., a user activating trigger 40, fluid ingress providing a false active signal of trigger 40, etc.). For example, processing circuit 50 may perform operations in response to CEW 1 receiving power supply 60 (e.g., in response to a battery being inserted or coupled to CEW 1). Processing circuit 50 may determine a status of control interface 45 (e.g., a control interface status). For example, control interface 45 may comprise a safety status, an armed status, or the like. Processing circuit 50 may determine a status of trigger 40 (e.g., a trigger status). For example, trigger 40 may comprise an active status, an inactive status, or the like. Based on the control interface status and the trigger status, processing circuit 50 may determine a lockout condition. For example, in response to the control interface status being armed and the trigger status being active, processing circuit 50 may retrieve a lockout condition associated with the identified condition. Processing circuit 50 may perform the lockout condition (e.g., output a lockout alert, execute a lockout action, etc.). For example, the lockout condition may comprise a lockout alert of flashing a red power LED and/or one or more of the flashlight and/or aiming LASER. The lockout condition may comprise a lockout action of temporarily preventing deployment of CEW 1. The lockout action may be removed in response to an unlock event being performed on CEW 1, such as, for example, changing the status of control interface 45 and/or trigger 40, removing and reinserting power supply 60, and/or the like.

Referring now to FIGS. 2-7, the process flows depicted are merely embodiments and are not intended to limit the scope of the disclosure. For example, the steps recited in any of the method or process descriptions may be executed in any order and are not limited to the order presented. As a further example, one or more steps recited in any of the method or process descriptions may be omitted. It will be appreciated that the following description makes appropriate references not only to the steps depicted in FIGS. 2-7, but also to the various CEW components as described above with reference to FIG. 1. Although the below makes reference to a CEW performing the steps depicted in FIGS. 2-7, one or more of the steps in each process flow may be performed by components of the CEW (e.g., a processing circuit), a computer-based system, a smart device, a server, and/or the like.

Figure 2:
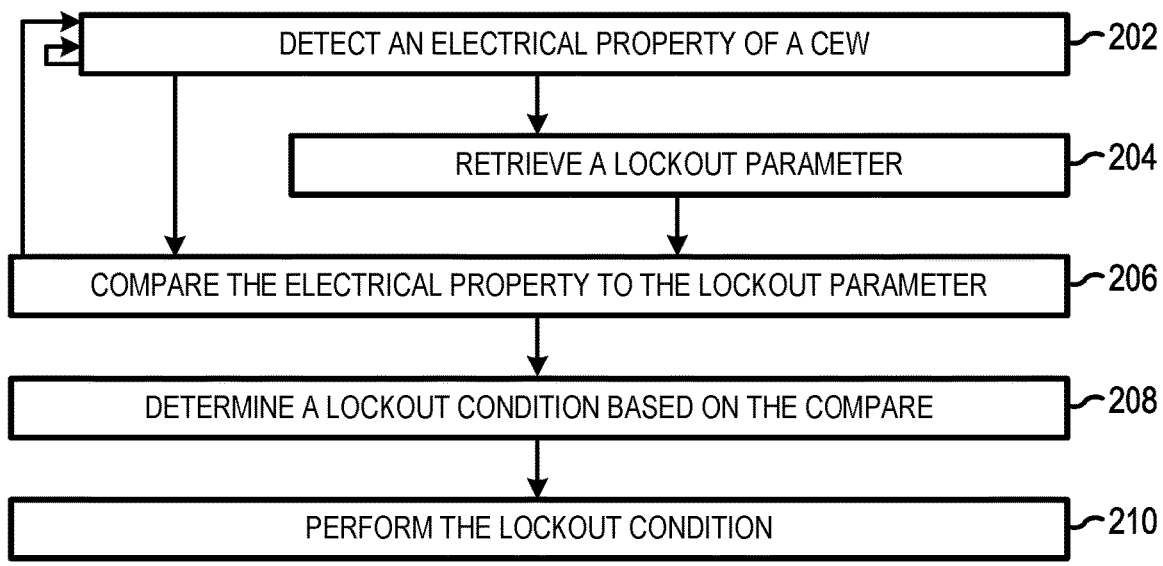
FIG. 2 illustrates a process flow for a method of detecting fluid ingress in a CEW based on an electrical property of the CEW, in accordance with various embodiments.

In various embodiment, and with specific reference to FIG. 2, a method 201 for detecting fluid ingress in a CEW based on an electrical property of the CEW is disclosed. The CEW may detect an electrical property of a CEW component (step 202). The electrical property may be associated with one or more circuits and/or components of the CEW. An electrical property may comprise a voltage measurement, an impedance measurement, a measurement of an electrical signal input into a circuit or component, a measurement of an electrical signal output from a circuit or component, an electrical resistivity measurement, an electrical conductivity measurement, a dielectric strength measurement, and/or the like. The CEW may detect the electrical property using any suitable process or technique.

Figure 3:
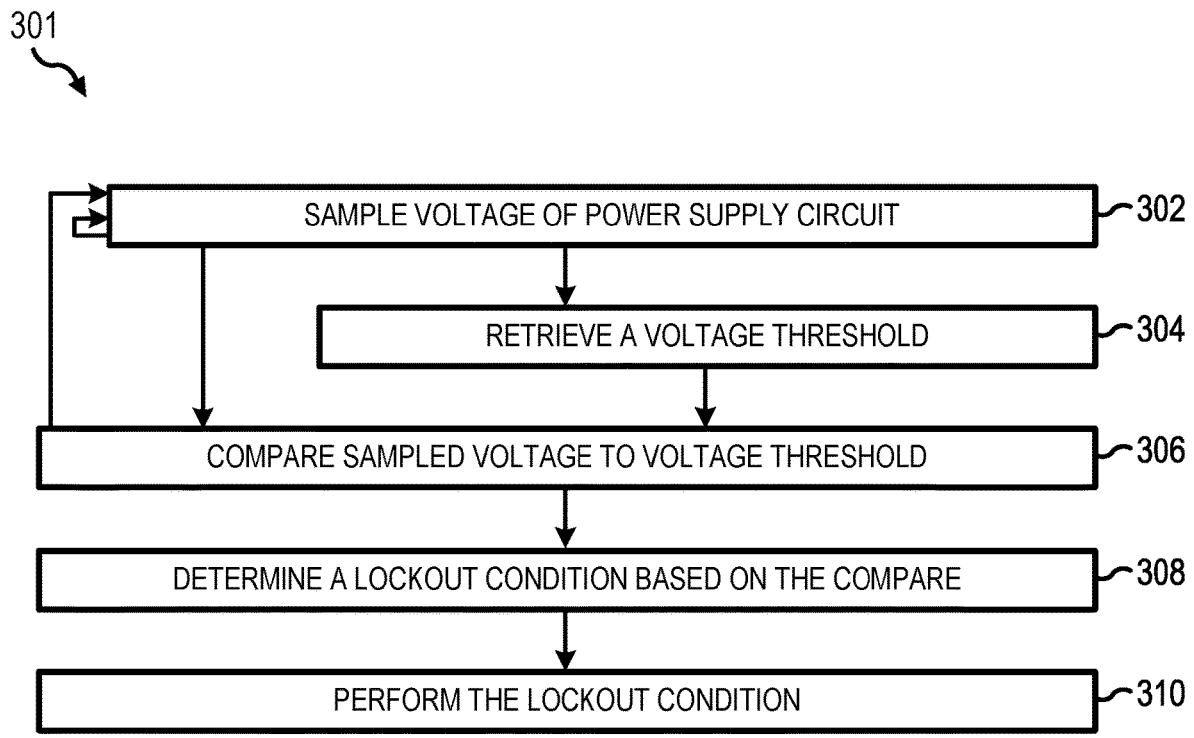
FIG. 3 illustrates a process flow for a method of detecting fluid ingress in a CEW based on a power supply circuit of the CEW, in accordance with various embodiments.

For example, the CEW may detect an electrical property by sampling voltage of a power supply circuit (e.g., as described in step 302, with brief reference to FIG. 3). The CEW may detect an electrical property by sampling voltage of a trigger circuit (e.g., as described in step 402, with brief reference to FIG. 4). The CEW may detect an electrical property by sampling input of a signal generator (e.g., as described in step 502, with brief reference to FIG. 5). The CEW may detect an electrical property by sampling output of a signal generator (e.g., as described in step 602, with brief reference to FIG. 6). The CEW may detect an electrical property by receiving a power supply, determining a control interface, and/or determining a trigger status (e.g., as described in steps 702, 704, 706, with brief reference to FIG. 7).

In various embodiments, the CEW may be configured to detect a plurality of electrical properties from one or more CEW components. For example, the CEW may be configured to detect a first electrical property and a second electrical property of a first CEW component. The CEW may be configured to detect a first electrical property of a first CEW component and a second electrical property of a second CEW component. The CEW may be configured to detect the plurality of electrical properties in any order, as previously discussed herein.

The CEW may retrieve a lockout parameter (step 204). The lockout parameter may be retrieved from memory of the CEW. The lockout parameter may be associated with the one or more circuits and/or components of the detected electrical property. The lockout parameter may define a normal operating measurement (e.g., an expected operating measurement, a typical operating measurement, etc.) of the one or more circuits and/or components. For example, the lockout parameter may comprise a threshold defining a minimum measurement and/or a maximum measurement expected within a normal operating measurement of a circuit or component. As a further example, a lockout parameter may define a measurement range expected for a normal operating measurement of a circuit or component.

In various embodiments, the CEW may be configured to retrieve a plurality of lockout parameters. For example, the CEW may be configured to retrieve a number of lockout parameters corresponding to a number of electrical properties detected in step 202.

The CEW may compare the electrical property to the lockout parameter (step 206). For example, the CEW may compare whether the electrical property is greater than a minimum measurement, less than a maximum measurement, within a measurement range, and/or the like as defined by the lockout parameter. In response to the comparing indicating that the electrical property is within a normal operating measurement, the CEW may determine that there was not fluid ingress within the CEW (e.g., no fluid ingress, no fluid ingress that caused damage, no fluid ingress that impacted functionality, etc.). In response to the comparing indicating that the electrical property is not within a normal operating measurement, the CEW may determine that there was fluid ingress within the CEW (e.g., fluid ingress, fluid ingress that caused damage, fluid ingress that impacted functionality, etc.).

The CEW may determine a lockout condition based on the compare (step 208). The CEW may determine the lockout condition in response to the compare indicating that the electrical property is not within a normal operating measurement. The lockout condition may be retrieved from memory of the CEW. The lockout condition may be associated with the one or more circuits and/or components of the detected electrical property. In various embodiments, the lockout condition may comprise a lockout alert and/or a lockout action. The lockout alert may be configured to alert a user of the CEW that the CEW is not functioning properly. The lockout action may be configured to at least partially disable features and/or functionality of the CEW, such as disabling one or more features or components of the CEW, temporarily preventing deployment of the CEW, permanently preventing deployment of the CEW, and/or the like.

The CEW may perform the lockout condition (step 210). The CEW may perform the lockout condition in response to determining the lockout condition and/or the compare indicating that the electrical property is not within a normal operating measurement. The CEW may perform the lockout condition using any suitable process. For example, performing a lockout alert of the lockout condition may comprise outputting a visual alert (e.g., light output, a change in light output, a flashing light, a user display output, etc.), an audio alert (e.g., an audible output, a warning sound, etc.), a haptic alert (e.g., a haptic output, a haptic feedback, etc.), and/or the like. Performing a lockout action of the lockout condition may comprise disabling one or more features or components of the CEW, temporarily preventing deployment of the CEW, permanently preventing deployment of the CEW, and/or the like. Disabling one or more features or components of the CEW may include disabling an output (e.g., visual output, audio output, haptic output, etc.), disabling a mode, disabling (e.g., ceasing to provide energy to) an electrical or electronic component, disabling a mechanical component, disabling provision of a stimulus signal, disabling deployment of deployment units, and/or the like. Temporarily preventing deployment of the CEW may include preventing deployment of the CEW until an unlock event occurs. An unlock event may include an operation of an interface (e.g., operation of a user interface, control interface, etc.), removing a power supply, providing a new power supply, a maintenance event, successful completion of a new load test, and/or the like. Permanently preventing deployment of the CEW may include preventing deployment of the CEW regardless of whether an unlock event occurred. In that regard, the CEW may no longer be used for future deployments.

In various embodiment, and with specific reference to FIG. 3, a method 301 for detecting fluid ingress in a CEW based on a power supply circuit of the CEW is disclosed. The CEW may be configured to detect abnormal voltage levels on the power supply circuit. Abnormal voltage levels may indicate fluid ingress. The CEW may sample a voltage of a power supply circuit (step 302). The CEW may sample the voltage any number of times. The CEW may sample the voltage over a period of time, at time intervals, and/or the like.

The CEW may retrieve a voltage threshold (step 304). The CEW may retrieve the voltage threshold (e.g., a power supply voltage threshold, a power supply circuit voltage threshold, etc.) from memory. The voltage threshold may be associated with a power supply and/or the power supply circuit. The voltage threshold may define a normal voltage level (or abnormal voltage level) for the power supply and/or the power supply circuit. The voltage threshold may define a minimum voltage, a maximum voltage, an acceptable voltage range, and/or the like.

The CEW may compare the sampled voltage to the voltage threshold (step 306). For example, the CEW may compare whether the sampled voltage is less than a minimum voltage, greater than a maximum voltage, within an acceptable voltage range, and/or the like as defined by the voltage threshold. In response to the comparing indicating that the sampled voltage is within the voltage threshold, the CEW may determine that there was not fluid ingress within the CEW (e.g., no fluid ingress, no fluid ingress that caused damage, no fluid ingress that impacted functionality, etc.). In response to the comparing indicating that the sampled voltage is not within the voltage threshold, the CEW may determine that there was fluid ingress within the CEW (e.g., fluid ingress, fluid ingress that caused damage, fluid ingress that impacted functionality, etc.).

The CEW may determine a lockout condition based on the compare (step 308). The CEW may determine the lockout condition in response to the compare indicating that the sampled voltage is not within the voltage threshold. In some embodiments, the CEW may determine a lockout condition in response to the comparing indicating a single sampled voltage was an abnormal voltage level. In some embodiments, the CEW may determine a lockout condition in response to the comparing indicating a plurality of sampled voltages were abnormal. The lockout condition may be retrieved from memory of the CEW. The lockout condition may be associated with the power supply and/or the power supply circuit. The lockout condition may comprise a lockout alert and/or a lockout action. The lockout condition may comprise any suitable or desired lockout alert and/or lockout action.

The CEW may perform the lockout condition (step 310). The CEW may perform the lockout condition in response to determining the lockout condition and/or the compare indicating that the sampled voltage is not within the voltage threshold. The CEW may perform the lockout condition using any suitable process. In various embodiments, the lockout condition may comprise a lockout alert of flashing a red power LED.

Figure 4:
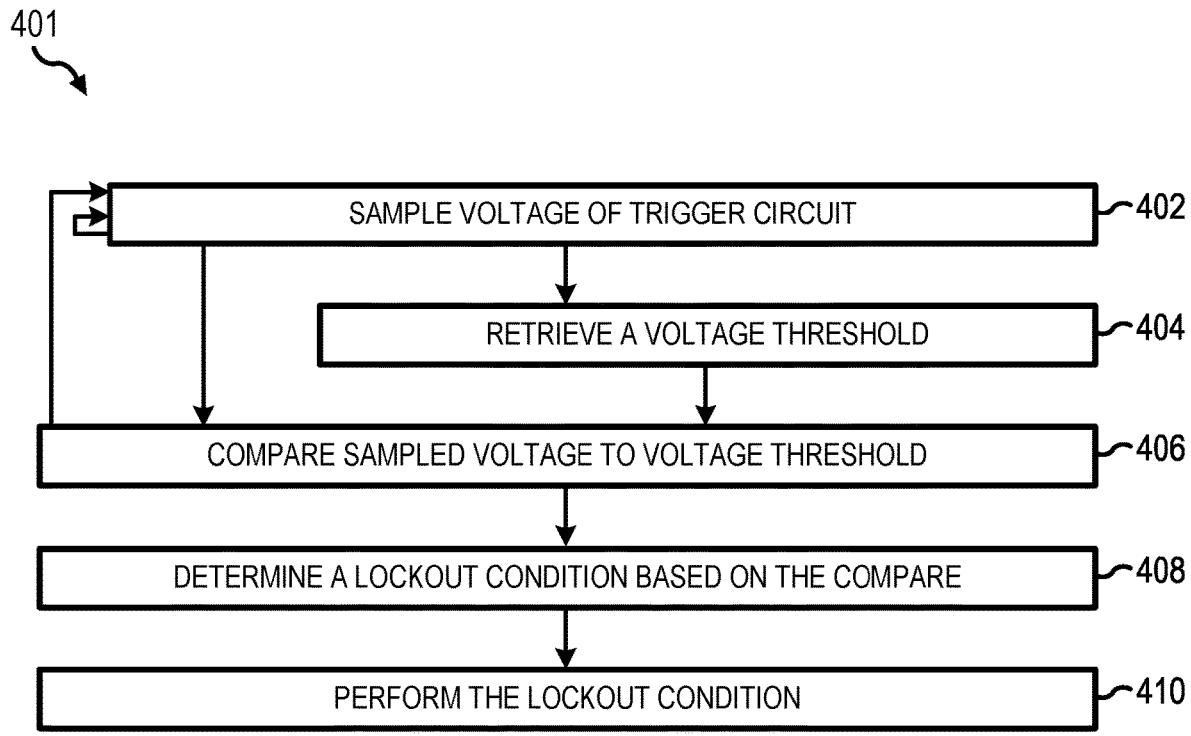
FIG. 4 illustrates a process flow for a method of detecting fluid ingress in a CEW based on a trigger circuit of the CEW, in accordance with various embodiments.

In various embodiment, and with specific reference to FIG. 4, a method 401 for detecting fluid ingress in a CEW based on a trigger circuit of the CEW is disclosed. The CEW may be configured to detect abnormal voltage levels on the trigger circuit. Abnormal voltage levels may indicate fluid ingress. The CEW may sample a voltage of a trigger circuit (step 402). The CEW may sample the voltage any number of times. For example, a trigger switch of the trigger circuit may transition from HI to LOW (5 volts to 0 volts) at a fast rate. The CEW may sample the trigger switch digitally. The CEW may sample the voltage over a period of time, at time intervals, and/or the like. The CEW may sample the trigger switch at intervals. For example, the CEW may sample the trigger switch multiple times a second, such as 50 times a second.

The CEW may retrieve a voltage threshold (step 404). The CEW may retrieve the voltage threshold (e.g., a trigger voltage threshold, a trigger circuit voltage threshold, etc.) from memory. The voltage threshold may be associated with a trigger and/or the trigger circuit. The voltage threshold may define a normal voltage level (or abnormal voltage level) for the trigger and/or the trigger circuit. The voltage threshold may define a minimum voltage, a maximum voltage, an acceptable voltage range, and/or the like. For example, in accordance with some embodiments, the voltage threshold may define normal voltage levels as voltage above 4.2 volts or below 0.5 volts (e.g., an acceptable voltage range). Accordingly, a sampled voltage between 4.2 volts and 0.5 volts would indicate an abnormal voltage level.

The CEW may compare the sampled voltage to the voltage threshold (step 406). For example, the CEW may compare whether the sampled voltage is less than a minimum voltage, greater than a maximum voltage, within an acceptable voltage range, and/or the like as defined by the voltage threshold. In response to the comparing indicating that the sampled voltage is within the voltage threshold, the CEW may determine that there was not fluid ingress within the CEW (e.g., no fluid ingress, no fluid ingress that caused damage, no fluid ingress that impacted functionality, etc.). In response to the comparing indicating that the sampled voltage is not within the voltage threshold, the CEW may determine that there was fluid ingress within the CEW (e.g., fluid ingress, fluid ingress that caused damage, fluid ingress that impacted functionality, etc.).

The CEW may determine a lockout condition based on the compare (step 408). The CEW may determine the lockout condition in response to the compare indicating that the sampled voltage is not within the voltage threshold. In some embodiments, the CEW may determine a lockout condition in response to the comparing indicating a single sampled voltage was an abnormal voltage level. In some embodiments, the CEW may determine a lockout condition in response to the comparing indicating a plurality of sampled voltages were abnormal. The lockout condition may be retrieved from memory of the CEW. The lockout condition may be associated with the trigger and/or the trigger circuit. The lockout condition may comprise a lockout alert and/or a lockout action. The lockout condition may comprise any suitable or desired lockout alert and/or lockout action.

The CEW may perform the lockout condition (step 410). The CEW may perform the lockout condition in response to determining the lockout condition and/or the compare indicating that the sampled voltage is not within the voltage threshold. The CEW may perform the lockout condition using any suitable process. In various embodiments, the lockout condition may comprise a lockout alert of flashing a red power LED and an aiming LASER. The lockout condition may also comprise a lockout action of permanently preventing deployment of the CEW.

Figure 5:
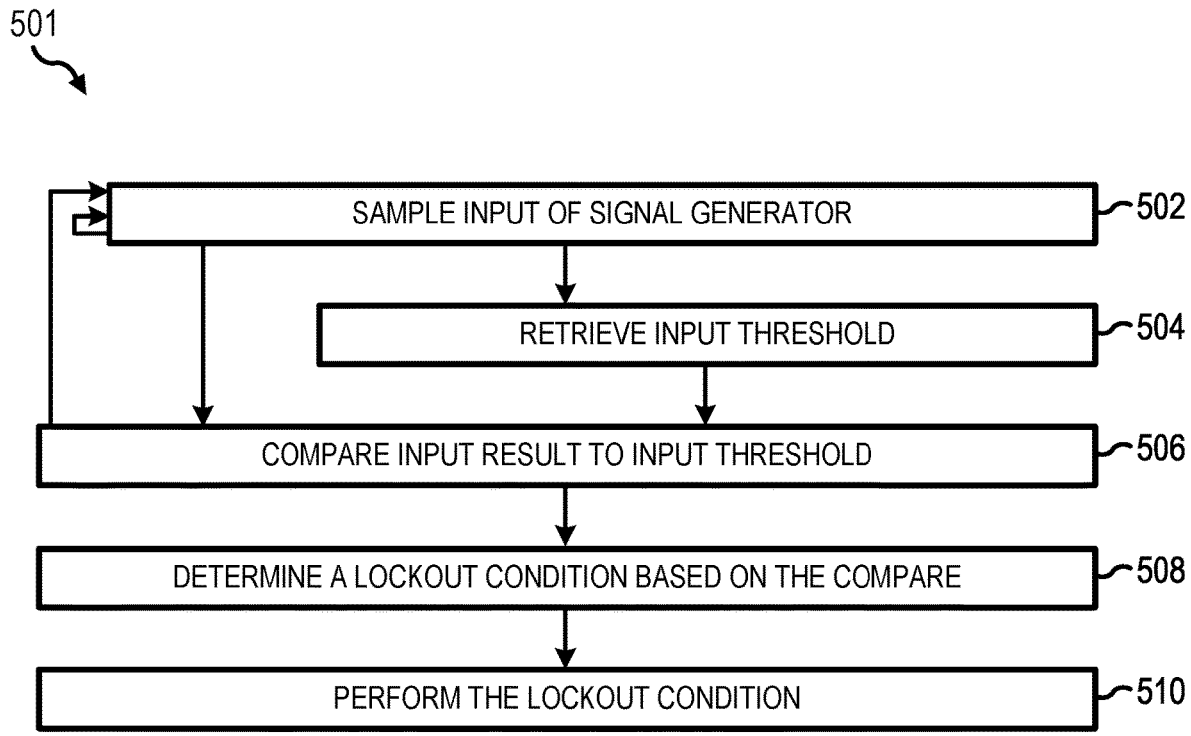
FIG. 5 illustrates a process flow for a method of detecting fluid ingress in a CEW based on an input into a signal generator of the CEW, in accordance with various embodiments.

In various embodiment, and with specific reference to FIG. 5, a method 501 for detecting fluid ingress in a CEW based on an input into a signal generator of the CEW is disclosed. The CEW may be configured to detect whether an HV module of a signal generator input circuit is able to be charged. The CEW may be configured to detect whether the HV module of a signal generator input circuit is able to be charged a plurality of times. An inability to charge, difficulties charging, and/or abnormal charging of the HV module may indicate fluid ingress. The CEW may sample input of a signal generator (step 502). For example, the CEW may sample input of the signal generator, the HV module, and/or the signal generator input circuit. Sampling input may comprise determining and counting a number of times the HV module is successfully charged. During a load test, the HV module may be repeatedly charged with pulses of electricity. For example, in some embodiments, the HV module may be charged 280 times (e.g., 280 charging events, 280 successful charging pulses, etc.).

The CEW may retrieve an input threshold (step 504). The CEW may retrieve the input threshold from memory. The input threshold may be associated with the signal generator, the HV module, and/or the signal generator input circuit. The input threshold may define a minimum count the HV module should be successfully charged during a normal test, a range of count the HV module should be successfully charged during a normal test, and/or the like. The input threshold may define a minimum number of successful charges during a normal load test, such as, for example, 150 successful charges. Accordingly, an input result indicating the HV module was successfully charged in 160 of 280 charging events may indicate that the HV module is functioning properly. An input result indicating the HV module was successfully charged in 110 of 280 charging events may indicate that the HV module is not functioning properly.

The CEW may compare an input result to the input threshold (step 506). For example, the CEW may compare whether the input result is outside the input threshold (e.g., less than the minimum count, not within the range of count, etc.). In response to the comparing indicating that the input result is within the input threshold, the CEW may determine that there was not fluid ingress within the CEW (e.g., no fluid ingress, no fluid ingress that caused damage, no fluid ingress that impacted functionality, etc.). In response to the comparing indicating that the input result is not within the input threshold, the CEW may determine that there was fluid ingress within the CEW (e.g., fluid ingress, fluid ingress that caused damage, fluid ingress that impacted functionality, etc.).

The CEW may determine a lockout condition based on the compare (step 508). The CEW may determine the lockout condition in response to the compare indicating that the input result is not within the input threshold. In some embodiments, the CEW may determine a lockout condition in response to the comparing indicating a single input result was not within the input threshold. In some embodiments, the CEW may determine a lockout condition in response to the comparing indicating a plurality of input results were not within the input threshold. The lockout condition may be retrieved from memory of the CEW. The lockout condition may be associated with the signal generator, the HV module, and/or the signal generator input circuit. The lockout condition may comprise a lockout alert and/or a lockout action. The lockout condition may comprise any suitable or desired lockout alert and/or lockout action.

The CEW may perform the lockout condition (step 510). The CEW may perform the lockout condition in response to determining the lockout condition and/or the compare indicating that the input result is not within the input threshold. The CEW may perform the lockout condition using any suitable process. In various embodiments, the lockout condition may comprise a lockout alert of flashing a red power LED. The lockout condition may also comprise a lockout action of temporarily preventing deployment of CEW 1. The temporary prevention may be removed in response to an unlock event being performed on CEW 1, such as, for example, successful completion of a new load test, and/or the like.

Figure 6:
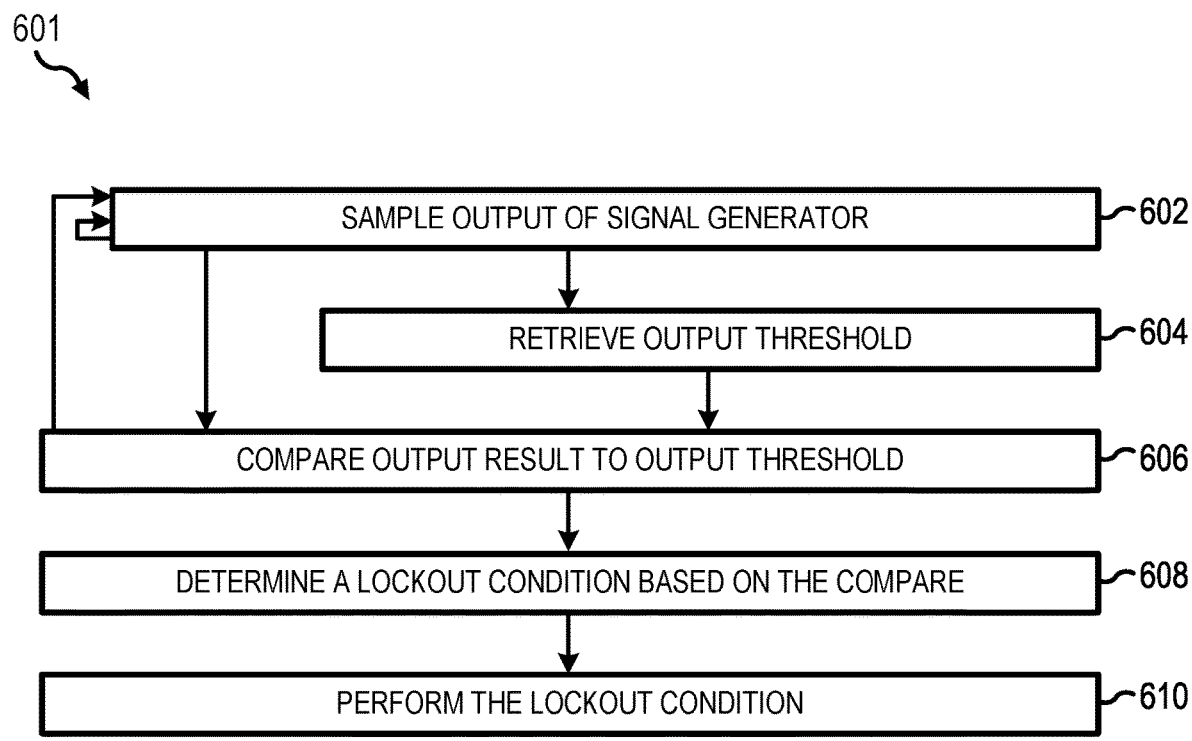
FIG. 6 illustrates a process flow for a method of detecting fluid ingress in a CEW based on an output from a signal generator of the CEW, in accordance with various embodiments.

In various embodiments, and with specific reference to FIG. 6, a method 601 for detecting fluid ingress in a CEW based on an output from a signal generator of the CEW is disclosed. The CEW may be configured to detect a change in decay rate of a capacitor of the signal generator output circuit (e.g., a muscle capacitor). For example, during or responsive to a fluid ingress a significant change in decay rate may be observed in one or more capacitors of the signal generator output circuit. The CEW may sample output of a signal generator (step 602). For example, the CEW may sample output of the signal generator, the one or more capacitors, and/or the signal generator output circuit. Sampling output may comprise determining a decay rate of a capacitor. An output result of the sampling may comprise a voltage measurement over a period of time (e.g., a voltage measurement of 90 millivolts and a time of measurement of 400 millisecond).

The CEW may retrieve an output threshold (step 604). The CEW may retrieve the output threshold from memory. The output threshold may be associated with the signal generator, the capacitor, and/or the signal generator output circuit. The output threshold may define a minimum decay rate, a maximum decay rate, a decay rate range, a normal decay rate, and/or the like associated with the capacitor. The output threshold may define a threshold and a time of measurement defining a normal decay rate. For example, the output threshold may comprise a minimum threshold of 80 millivolts and a time of measurement of 400 milliseconds. The time of measurement may be the same as the period of time for sampling output. Accordingly, an output result indicating a voltage measurement of 90 millivolts and a time of measurement of 400 millisecond may indicate that the capacitor is functioning properly. An output result indicating a voltage measurement of 70 millivolts and a time of measurement of 400 millisecond may indicate that the capacitor is not functioning properly.

The CEW may compare an output result to the output threshold (step 606). For example, the CEW may compare whether the output result is outside the output threshold (e.g., less than the minimum decay rate, greater than the maximum decay rate, not within the decay rate range, etc.). In response to the comparing indicating that the output result is within the output threshold, the CEW may determine that there was not fluid ingress within the CEW (e.g., no fluid ingress, no fluid ingress that caused damage, no fluid ingress that impacted functionality, etc.). In response to the comparing indicating that the output result is not within the output threshold, the CEW may determine that there was fluid ingress within the CEW (e.g., fluid ingress, fluid ingress that caused damage, fluid ingress that impacted functionality, etc.).

The CEW may determine a lockout condition based on the compare (step 608). The CEW may determine the lockout condition in response to the compare indicating that the output result is not within the output threshold. In some embodiments, the CEW may determine a lockout condition in response to the comparing indicating a single output result was not within the output threshold. In some embodiments, the CEW may determine a lockout condition in response to the comparing indicating a plurality of output results were not within the output threshold. The lockout condition may be retrieved from memory of the CEW. The lockout condition may be associated with the signal generator, the capacitor, and/or the signal generator output circuit. The lockout condition may comprise a lockout alert and/or a lockout action. The lockout condition may comprise any suitable or desired lockout alert and/or lockout action.

The CEW may perform the lockout condition (step 610). The CEW may perform the lockout condition in response to determining the lockout condition and/or the compare indicating that the output result is not within the output threshold. The CEW may perform the lockout condition using any suitable process. In various embodiments, the lockout condition may comprise a lockout alert of flashing a red power LED. The lockout condition may also comprise a lockout action of disabling a flashlight and/or an aiming LASER of the CEW. The lockout action may be removed in response to an unlock event being performed on the CEW, such as, for example, successful completion of a new load test, replacement of a new and/or fully charged power supply, and/or the like.

Figure 7:
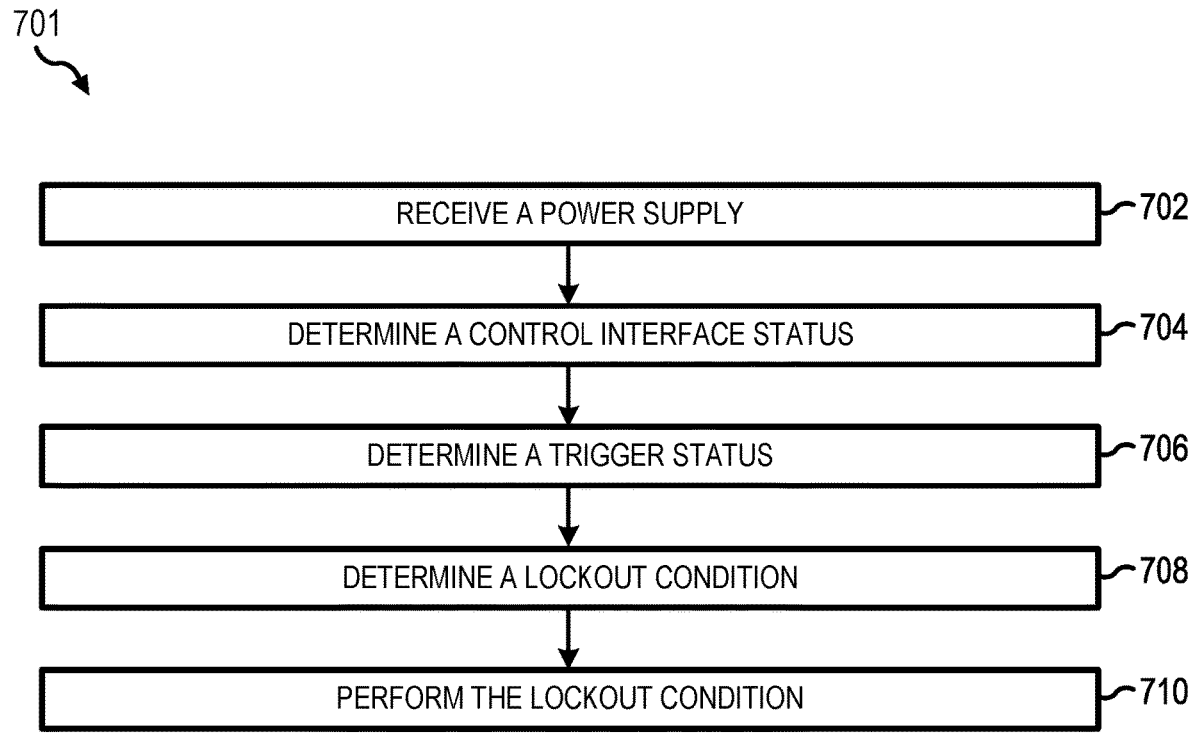
FIG. 7 illustrates a process flow for a method of performing a lockout condition on a CEW responsive to receiving a power supply, in accordance with various embodiments.

In various embodiment, and with specific reference to FIG. 7, a method 701 for performing a lockout condition on a CEW responsive to receiving a power supply is disclosed. The CEW may be configured to at least partially prevent an unintended deployment of the CEW in response to a power supply being inserted into the CEW while the CEW is armed (e.g., a control interface set to armed, fluid ingress providing a false armed signal from the control interface, a mechanical error in the control interface, etc.) and a trigger being activated (e.g., a user activating the trigger, fluid ingress providing a false active signal of the trigger, a mechanical error in the trigger, etc.). The CEW may receive a power supply (step 702). For example, a user may insert the power supply into the CEW. A user may also couple the power supply to the CEW, or otherwise provide electrical power to the CEW.

The CEW may determine a control interface status (step 704). The CEW may determine the control interface status in response to the CEW receiving power from the power supply. The control interface may comprise a safety status, an armed status, or the like. The CEW may determine the control interface status using any suitable process, such as, for example, detecting the status of one or more electrical properties of the control interface.

The CEW may determine a trigger status (step 706). The CEW may determine the trigger status in response to the CEW receiving power from the power supply. The trigger may comprise an active status, an inactive status, or the like. The CEW may determine the trigger status using any suitable process, such as, for example, detecting the status of one or more electrical properties of the trigger.

The CEW may determine a lockout condition (step 708). The CEW may determine the lockout condition in response to the control interface status indicating armed and/or the trigger status indicating active. The CEW may retrieve the lockout condition from memory. The lockout condition may be associated with the control interface status and/or the trigger status. The lockout condition may be associated with the trigger and/or the control interface. The lockout condition may comprise a lockout alert and/or a lockout action. The lockout condition may comprise any suitable or desired lockout alert and/or lockout action.

The CEW may perform the lockout condition (step 710). The CEW may perform the lockout condition in response to determining the lockout condition and/or determining the control interface status and/or the trigger status. The CEW may perform the lockout condition using any suitable process. In various embodiments, the lockout condition may comprise a lockout alert of flashing a red power LED and/or one or more of the flashlight and/or aiming LASER. The lockout condition may comprise a lockout action of temporarily preventing deployment of the CEW. The lockout action may be removed in response to an unlock event being performed on the CEW, such as, for example, changing the status of the control interface and/or the trigger, removing and reinserting the power supply, and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:
   detecting, by a conducted electrical weapon ("CEW"), an electrical property associated with a component of the CEW;

comparing, by the CEW, the electrical property to a lockout parameter, wherein the lockout parameter is associated with the component;

determining, by the CEW and in response to the comparing, a lockout condition; and performing, by the CEW, the lockout condition on the CEW, wherein the lockout condition comprises a lockout alert and a lockout action, wherein the lockout alert comprises at least one of a visual alert, an audio alert, or a haptic alert, and wherein the lockout action comprises at least one of disabling a feature of the CEW, disabling the component, disabling a second component, temporarily preventing deployment of the CEW, permanently preventing deployment of the CEW, testing a next electrical circuit, or testing a next component of the CEW.

2. The method of claim 1, wherein the electrical property comprises at least one of a voltage measurement, a first measurement of an electrical signal input into the component, or a second measurement of an electrical signal output from the component.

3. The method of claim 1, wherein the lockout parameter comprises at least one of a minimum threshold, a maximum threshold, or a measurement range.

4. The method of claim 1, wherein the component comprises a power supply circuit, wherein the detecting the electrical property comprises sampling a voltage of the power supply circuit, and wherein the lockout parameter comprises a voltage threshold.

5. The method of claim 1, wherein the component comprises a trigger circuit, wherein the detecting the electrical property comprises sampling a voltage of the trigger circuit, and wherein the lockout parameter comprises a voltage threshold range indicating an abnormal voltage level.

6. The method of claim 1, wherein the component comprises a signal generator, wherein the detecting the electrical property comprises determining whether a high-voltage (HV) module of the signal generator is successfully charged during a load test, and wherein the lockout parameter comprises a minimum number of successful charges during a normal load test.

7. The method of claim 1, wherein the component comprises a signal generator, wherein the detecting the electrical property comprises determining a decay rate of a capacitor of the signal generator, and wherein the lockout parameter comprises a voltage threshold and a time of measurement defining a normal decay rate.

8. A handle for a conducted electrical weapon comprising:
a processing circuit;
a power supply;
a component electrically coupled to the power supply; and
a tangible, non-transitory memory configured to communicate with the processing circuit, wherein the tangible, non-transitory memory comprises instructions stored thereon that, in response to execution by the processing circuit, cause the processing circuit to perform operations comprising:
detecting an electrical property associated with the component;
comparing the electrical property to a lockout parameter, wherein the lockout parameter is associated with the component;
determining a lockout condition based on the comparing; and
performing the lockout condition on the handle,
wherein the lockout condition comprises a lockout alert and a lockout action,
wherein the lockout alert comprises at least one of a visual alert, an audio alert, or a haptic alert, and
wherein the lockout action comprises at least one of disabling a feature, disabling the component, disabling a second component, temporarily preventing a deployment, permanently preventing the deployment, testing a next electrical circuit, or testing a next component.

9. The handle of claim 8, wherein the electrical property comprises at least one of a voltage measurement, a first measurement of an electrical signal input into the component, or a second measurement of an electrical signal output from the component.

10. The handle of claim 8, wherein the lockout parameter comprises at least one of a minimum threshold, a maximum threshold, or a measurement range.

11. The handle of claim 8, wherein the component comprises a power supply circuit, wherein the detecting the electrical property comprises sampling a voltage of the power supply circuit, and wherein the lockout parameter comprises a voltage threshold.

12. The handle of claim 8, wherein the component comprises a trigger circuit, wherein the detecting the electrical property comprises sampling a voltage of the trigger circuit, and wherein the lockout parameter comprises a voltage threshold range indicating an abnormal voltage level.

13. The handle of claim 8, wherein the component comprises a signal generator, wherein the detecting the electrical property comprises determining whether a high-voltage (HV) module of the signal generator is successfully charged during a load test, and wherein the lockout parameter comprises a minimum number of successful charges during a normal load test.

14. The handle of claim 8, wherein the component comprises a signal generator, wherein the detecting the electrical property comprises determining a decay rate of a capacitor of the signal generator, and wherein the lockout parameter comprises a voltage threshold and a time of measurement defining a normal decay rate.

15. The handle of claim 8, wherein the component comprises a control interface and a trigger, wherein the detecting the electrical property comprises determining a first status of the control interface and a second status of the trigger, and wherein the lockout parameter comprises the first status being armed and the second status being active.

16. The handle of claim 8, wherein the lockout action comprises temporarily preventing the deployment, and further comprising:
detecting an unlock event; and
enabling the deployment based on the unlock event.

17. The handle of claim 16, wherein the unlock event comprises at least one of operation of an interface, removal of the power supply, provision of a new power supply, a maintenance event, or a successful completion of a new load test.

18. The method of claim 1, wherein the component comprises a control interface and a trigger, wherein the detecting the electrical property comprises determining a first status of the control interface and a second status of the trigger, and wherein the lockout parameter comprises the first status being armed and the second status being active.

19. The method of claim 1, wherein the lockout action comprises temporarily preventing the deployment of the CEW, and further comprising:
detecting, by the CEW, an unlock event; and enabling, by the CEW, the deployment of the CEW based on the unlock event.

20. The method of claim 19, wherein the unlock event comprises at least one of operation of an interface, removal of a power supply, provision of a new power supply, a maintenance event, or a successful completion of a new load test.

\* \* \* \* \*